Feb. 19, 1952      S. P. V. PIATTI      2,586,082
MOTOR UNIT FOR BICYCLES AND LIKE VEHICLES
Filed Oct. 16, 1948
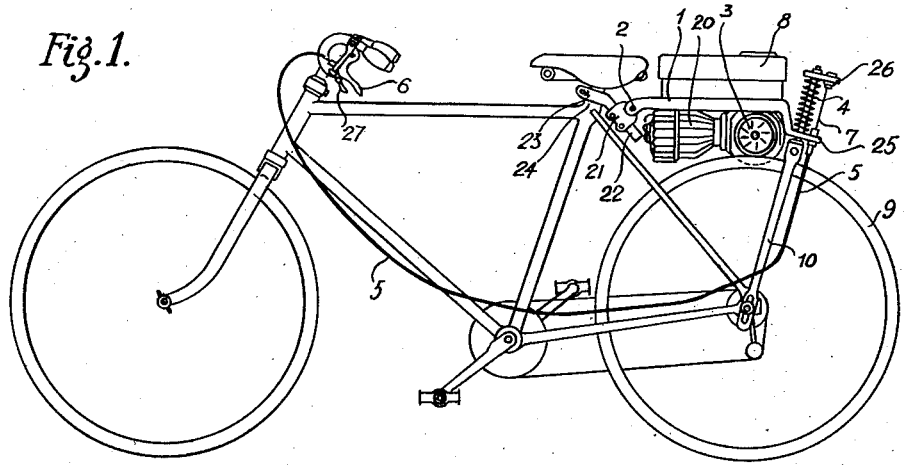
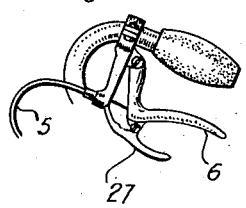
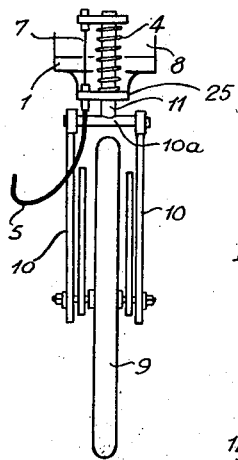
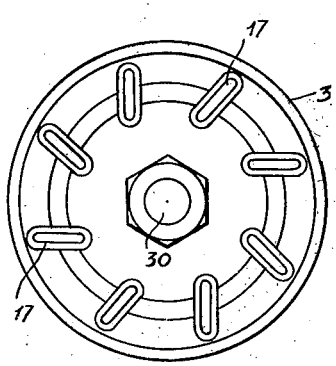
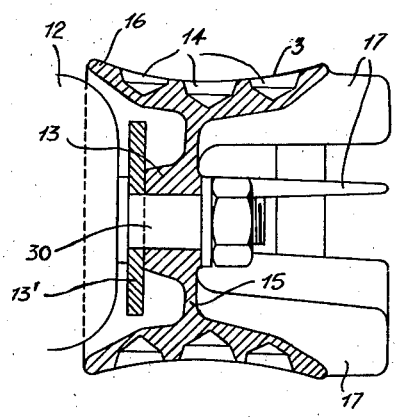
Inventor
SANZIO PIO VINCENZO PIATTI
By
Blair, Curtis & Hayward
Attorneys Patented Feb. 19, 1952

2,586,082

UNITED STATES PATENT OFFICE 2,586,082

MOTOR UNIT FOR BICYCLES AND LIKE VEHICLES

Sanzio P. V. Piatti, Milan, Italy

Application October 16, 1948, Serial No. 54,862
In France June 2, 1947

9 Claims. (Cl. 180—33)

The present invention relates to a motor unit for bicycles and like vehicles, and provides a motor unit comprising a support member carrying a motor provided with a friction driving roller, the support member having means for pivotally mounting it on a bicycle or the like so that the roller is adapted to bear upon the tire of a wheel of the bicycle or the like for imparting a friction drive to the tire and so that the support member is turnable on its pivot for moving the roller into and out of driving engagement with the tire, and a control device connected to the support member and having a handle adapted to be mounted on the handlebars of the bicycle or the like for turning the support member on its pivot to control the engagement of the roller with the tire, so as to enable the roller to be engaged with and disengaged from the tire at will by the rider while riding.

Preferably, the motor unit also comprises a device adapted to be mounted on the bicycle or the like for guiding the support member in its turning movement on its pivot. According to a feature of the invention, a resilient member acts upon the support member to urge the roller into a position corresponding to the position of driving engagement with the tire when the unit is mounted on the bicycle, the control device being adapted to act on the support member in opposition to the resilient member for disengaging the roller. Preferably, the control device, the guiding device and the resilient member all act on the same part of the support member.

The invention also consists in a motor unit for bicycles and like vehicles, comprising an elongated support carrying a motor and its fuel tank which are mounted respectively below and above the support and so that the motor crankshaft is positioned transversely of the support, the crankshaft carrying a friction driving roller, said support being pivoted by a transverse pivot at one end thereof to a bracket adapted to be fixed to the saddle pillar of a bicycle or the like so that the pivot is substantially horizontal and the support member is adapted to overlie a rear wheel of the bicycle or the like in a position such that the driving roller is adapted to bear upon the tire of the wheel for imparting a friction drive thereto, and so that the support is turnable on its pivot for moving the roller into and out of engagement with the tire, the support being slidably guided at its other end on a guide member mounted on a fork adapted to be mounted on the wheel spindle, a coil spring mounted on the guide member and bearing between the guided end of the support and an abutment fixed relatively to the guide member so as to urge the guided end of the support away from said abutment, and a cable or the like control device attached at one end to said abutment and the guided end of the support and provided at its other end with a hand lever or similar handle adapted to be mounted on the handlebars of the bicycle or the like for exerting a pull on the cable or the like to displace the guided end of the support along the guide member against the action of said spring for raising the support about its pivot to disengage the roller from the tire.

The handle or hand lever of the control device may be provided with a latch for holding the handle or hand lever in a position corresponding to the disengaged position of the roller.

The invention also embraces improvements in the construction and arrangement of the roller, as will be hereinafter described and pointed out more particularly in the appended claims.

In order that the invention may be more clearly understood, an embodiment thereof will now be described, by way of example, with reference to the accompanying drawings, in which Fig. 1 depicts a side elevation of a bicycle fitted with an embodiment of the motor unit according to the invention.

Fig. 1a is a fragmentary view depicting the control lever shown in Fig. 1, latched in an operated position.

Fig. 2 depicts a fragmentary view, showing a detail, looking from the rear of the bicycle in Fig. 1.

Fig. 3 depicts an axial section, and Fig. 4 an end view, of the driving roller.

The motor unit illustrated in Fig. 1 comprises a support member 1 carrying a horizontal motor 20 surmounted by its fuel tank 8. The crankshaft of the motor carries a driving roller 3 adapted to bear upon the tire of the rear wheel 9 of the bicycle to impart a friction drive to that wheel. The motor support 1 is fulcrumed at its forward end on a horizontal pivot 2 which is adapted to be fixed to the bicycle frame, for which purpose the pivot 2 is carried by a bracket 21 adjustably clamped on a tube 22 provided with a clamping collar 23 by which the tube 22 may be fixed to the saddle pillar 24 of the bicycle. It will be appreciated that the clamping collar 23 may be adjusted to any desired clamping position along the saddle pillar 25 and that the bracket 21 may likewise be clamped at any desired adjusted position along the tube 22. Thereby, a range of adjustments is provided to suit different angles of inclination of the saddle pillar 25 and different diameters of rear wheel 9 that may be encountered in fitting the unit to different bicycles. At its rear end, the motor support 1 is slidably guided in a vertical plane by the shank 11 upstanding from the crown 10a (Fig. 2) of a fork 10 which is adapted to straddle the rear wheel 9 and be mounted at its slotted lower ends on the wheel spindle, the shank 11 passing through an aperture in a rear extension 25 of the support 1. The lower ends of the fork 10 are provided with elongated slots, as shown, to allow of mounting the fork to suit different rear wheel diameters that may be encountered in fitting the unit to different bicycles. A coil spring 4 encircling the shank 11 seats at its lower end on the extension 25 and at its upper end bears against a fixed abutment plate 26. One end of a Bowden cable has its outer sheath 5 attached to the extension 25, and its inner control wire or cable 7 attached to the abutment plate 26, the other end of the Bowden cable being attached in known manner to a control lever 6 which is adapted to be fixed to the bicycle handlebars in a position convenient for actuation by the rider's hand. The control lever 6 may be fitted, as shown, with a latching lever 27 for holding the control lever 6 in an actuated position, as illustrated in Fig. 1a.

When the motor unit is mounted on a bicycle, as shown, and the control lever 6 is not actuated to exert a tractive pull on the cable 7, the support 1 carrying the motor and its fuel tank is supported by the driving roller 3 bearing upon the tire of the bicycle wheel 9. The crown 10a of the fork 10 acts as a stop in conjunction with the extension part 25 of the support 1 to limit the descent of the latter about its pivot 2. The spring 4 resiliently presses on the part 25, allowing the motor support 1 to oscillate about its pivot 2 in response to road shocks and to motor vibration, and acting as a shock absorber to minimise transmission of such shocks and vibration to the bicycle frame, as well as ensuring that despite any such shocks and vibration the driving roller 3 is maintained in driving engagement with the tire. Engagement and disengagement of the drive is effected by means of the control lever 6, the actuation of which to transmit a pull on the cable 7 causes the motor support 1 to be raised about its pivot 2 and so disengage the driving roller 3 from the tire. The latch 27 permits the control lever 6 to be latched in such position with the drive disengaged, so as to relieve the rider of the need to maintain hand pressure on the lever 6, should he desire to maintain the drive disengaged. Manipulation of the control lever 6, in conjunction with the latch 27 if desired, permits disengagement of the drive without stopping the bicycle and also permits the drive to be engaged when the bicycle is well under way.

One of the major problems which arises with a motor unit arranged to impart a friction drive to a bicycle tire is to prevent overheating of the tire which, as is well known, considerably shortens the life of the tire. Heat which, if allowed to accumulate in the tire, can directly and adversely affect it, is developed in the tire both by its contact with the ground and with the driving roller. Moreover, the motor also develops heat which can reach the tire indirectly through the roller. In order to minimise flow of heat from the motor to the tire through the roller, various precautionary means may be employed, individually or in combination as found desirable. As examples of such means, a disc 13' (Fig. 3) made of a poor heat conductor, such as ebonite for example, may be interposed between the crankcase 12 of the motor and the hub 13 of the driving roller. As the motor crankshaft 30 can also transmit some heat to the hub 13, the axial width of the latter may be reduced to a practicable minimum. In order to minimise conduction of heat from the hub 13 of the roller to its rim 16, the cross-section offered to heat flow of the intermediate portion of the roller between its hub and rim may be reduced as far as practicable, for instance by constructing it as a thin web 15 connecting the hub 13 and rim 16, the thickness of this web being for example, only about 1/20 of the axial width of the roller. Alternatively or additionally for the same purpose, holes (not shown) may be provided in the aforesaid intermediate portion of the roller. Of course, if in addition to the thin web 15, such holes are also provided, it will be understood that they are so proportioned in number, dimensions and arrangement as not to impair the rigidity of the web.

However, aside from these expedients, the composition and construction of the roller itself is the most important factor in preventing overheating of the roller rim and the tire in contact therewith. Whereas the above-mentioned expedients aim at obstructing heat flow from the motor to the roller rim by reducing the cross-section of the flow path from the motor crankshaft 30 through the roller hub 13 and its intermediate portion, such as the web 15, another quite contrary solution is to construct the roller of a material of good thermal conductivity. This may appear paradoxical since it has been customary practice to avoid the use of metals and alloys for such rollers and to employ mineral substances which are poor heat conductors, such as natural or artificial stone, for example. Preferably, the roller is composed of an alloy which is a good heat conductor and resistant to abrasion, comprising copper, iron, aluminium and nickel which is subjected to a suitable hardening and tempering treatment.

The roller should be maintained as freely exposed to the air as possible, for cooling it. To promote cooling, laterally to its outside face are cast integral projecting cooling fins 17 (Figs. 3 and 4) which, by their rotation bodily with the roller, act as a fan and increase the cooling action. The roller thus constructed becomes no longer a source of heating for the tire but, on the contrary, it contributes to ensure the cooling of the tire and consequently its preservation.

As the alloy composition of the roller is a compromise between good conductivity and resistance to abrasion, the roller is itself resistant to wear at the same time as it reduces wear on the tire.

It will be noted from Fig. 3 that the external shape of the roller rim 16 is made sufficiently concave to embrace a large transverse section of the tire. It will also be noted that the rim 16 is provided with cavities 14 of conical or truncated conical cross-section. On a smooth and wet tire, which offers the worst conditions of drive transmission, these cavities act as suction cups materially improving the adhesion of the roller and tyre. If mud gathered by the tire collects in the cavities 14, it is readily expelled from them by centrifugal force due to the conicity of the cavities.

I claim:

1. In a motor unit for bicycles and like vehicles, the combination of an elongated motor support, a motor attached to the underside of said support with the motor crankshaft disposed transversely of said support, a friction driving roller on said crankshaft, an adjustable clamp bracket pivotally attached to one end of said support, a stem having said bracket adjustably clamped thereon for adjusting the position of said bracket along said stem, a clamp at one end of said stem for fixture about a bicycle saddle pillar to attach said stem to said pillar, a fork adapted for mounting on a bicycle rear wheel spindle, a guide member carried by said fork and upstanding from the crown thereof, means on said support slidably guided on said guide member, manual control means operable for pivoting said support about said clamp bracket, and spring means opposing pivoting movement of said support responsive to operation of said control means.

2. In a motor unit for bicycles and like vehicles, the combination of an elongated motor support, a motor attached to the underside of said support with the motor crankshaft disposed transversely of said support, a friction driving roller on said crankshaft, an adjustable clamp bracket pivotally attached to one end of said support, a stem having said bracket adjustably clamped thereon for adjusting the position of said bracket along said stem, a clamp at one end of said stem for fixture about a bicycle saddle pillar to attach said stem to said pillar, a fork adapted for mounting on a bicycle rear wheel spindle, a guide member carried by said fork and upstanding from the crown thereof, means on said support slidably guided on said guide member, a first cable anchorage on said support, a second cable anchorage on said guide member, a sheathed cable transmission including a flexible sheath anchored at one end to said first anchorage, a flexible cable extending within said sheath and anchored at one end to said second anchorage and means operable on the other ends of said sheath and cable for relatively moving said cable and said sheath to effect pivoting of said support relatively to said clamp bracket and slidable movement of said support relatively to said guide member, and a spring opposing said movement.

3. In a motor unit for bicycles and like vehicles, the combination of an elongated motor support, a motor attached to the underside of said support with the motor crankshaft disposed transversely of said support, a friction driving roller on said crankshaft, a fuel tank for said motor mounted on the topside of said support above said motor, an adjustable clamp bracket pivotally attached to one end of said support, a stem having said bracket adjustably clamped thereon for adjusting the position of said bracket along said stem, a clamp at one end of said stem for fixture about a bicycle saddle pillar to attach said stem to said pillar, a fork adapted for mounting on a bicycle rear wheel spindle, a guide member carried by said fork and upstanding from the crown thereof, means on said support slidably guided on said guide member, manual control means operable for pivoting said support about said clamp bracket, and spring means opposing pivoting movement of said support response to operation of said control means.

4. In a motor unit for bicycles and like vehicles, the combination of an elongated motor support, a motor attached to the underside of said support with the motor crankshaft disposed transversely of said support, a friction driving roller on said crankshaft, a fuel tank for said motor mounted on the topside of said support above said motor, an adjustable clamp bracket pivotally attached to one end of said support, a stem having said bracket adjustably clamped thereon for adjusting the position of said bracket along said stem, a clamp at one end of said stem for fixture about a bicycle saddle pillar to attach said stem to said pillar, a fork adapted for mounting on a bicycle rear wheel spindle, a guide member carried by said fork and upstanding from the crown thereof, means on said support slidably guided on said guide member, a first cable anchorage on said support, a second cable anchorage on said guide member, a sheathed cable transmission including a flexible sheath anchored at one end to said first anchorage, a flexible cable extending within said sheath and anchored at one end to said second anchorage, and means operable on the other ends of said sheath and cable for relatively moving said cable and said sheath to effect pivoting of said support relatively to said clamp bracket and slidable movement of said support relatively to said guide member, and a spring opposing said movement.

5. In a motor unit for bicycles and like vehicles, the combination of an elongated motor support, a motor attached to the underside of said support with the motor crankshaft disposed transversely of said support, a friction driving roller on said crankshaft, an adjustable clamp bracket pivotally attached to one end of said support, a stem having said bracket adjustably clamped thereon for adjusting the position of said bracket along said stem, a clamp at one end of said stem for fixture about a bicycle saddle pillar to attach said stem to said pillar, a fork having elongated slotted ends for mounting on a bicycle rear wheel spindle, a guide member carried by said fork and upstanding from the crown thereof, means on said support slidably guided on said guide member, manual control means operable for pivoting said support about said clamp bracket, and spring means opposing pivoting movement of said support responsive to operation of said control means, the adjustability of said clamp bracket along said stem and said elongated slotted ends of said stem rendering the unit adaptable for fitting to bicycles of different rear wheel diameters.

6. In a motor unit for bicycles and like vehicles, the combination of an elongated motor support, a motor detachably secured to the underside of said support with the motor crankshaft disposed transversely of said support, a friction driving roller on said crankshaft, trunnion means at one end of said support, an adjustable clamp bracket carrying a pivot journalled in said trunnion means, a stem having said bracket adjustably clamped thereon for adjusting the position of said bracket along said stem, a clamp at one end of said stem for fixture about a bicycle saddle pillar to attach said stem to said pillar, a fork adapted for mounting on a bicycle rear wheel spindle, a guide member carried by said fork and upstanding from the crown thereof, means on said support slidably guided on said guide member, manual control means operable for pivoting said support about said clamp bracket, and spring means opposing pivoting movement of said support responsive to operation of said control means.

7. In a motor unit for bicycles and like vehicles, the combination of an elongated motor support, a motor detachably secured to the underside of said support with the motor crankshaft disposed transversely of said support, a friction driving roller on said crankshaft, trunnion means at one end of said support, an adjustable clamp bracket carrying a pivot journalled in said trunnion means, a stem having said bracket adjustably clamped thereon for adjusting the position of said bracket along said stem, a clamp at one end of said stem for fixture about a bicycle saddle pillar to attach said stem to said pillar, a fork adapted for mounting on a bicycle rear wheel spindle, a guide member carried by said fork and upstanding from the crown thereof, means on said support slidably guided on said guide member, a first cable anchorage on said support, a second cable anchorage on said guide member, a sheathed cable transmission including a flexible sheath anchored at one end to said first anchorage, a flexible cable extending within said sheath and anchored at one end to said second anchorage, and means operable on the other ends of said sheath and cable for relatively moving said cable and said sheath to effect pivoting of said support relatively to said clamp bracket and slidable movement of said support relatively to said guide member, and a spring opposing said movement.

8. In a bicycle having a frame, a rear wheel and a saddle pillar, the combination of an elongated motor support disposed over said rear wheel and pivotally attached at its forward end to said saddle pillar, a fork mounted on the spindle of said wheel and having a guide member upstanding therefrom, rearwardly disposed means on said support forming a guideway slidably receiving said guide member, whereby to guide said support along said guide member upon pivotal movement of said support about its forward end, a motor attached to the underside of said support with the motor crankshaft disposed transversely of said support and carrying a friction driving roller overlying said wheel, control means under control of the operator for pivoting said support to bring said roller into and out of frictional driving engagement with the tire tread of said wheel, and a spring engaged between said support and said fork urging pivotal movement of said support towards a predetermined position and opposing movement of said support away from such position.

9. A motor unit for bicycles and like vehicles, comprising an elongated support carrying a motor and its fuel tank which are mounted respectively below and above the support and so that the motor crankshaft is positioned transversely of the support, the crankshaft carrying a friction driving roller, said support being pivoted by a transverse pivot at one end thereof to a bracket adapted to be fixed to a bicycle saddle pillar for positioning said support over a rear wheel of the bicycle, a fork adapted to be mounted on the wheel spindle, a guide member mounted on said fork, means for slidably guiding the end of said support remote from said pivot on said guide member, a coil spring mounted on said guide member and engaging between said support and an abutment on said guide member so as to urge the guided end of said support to a predetermined position along said guide member, and a control device including a cable and flexible sheath attached at one end respectively to said abutment and to the guided end of said support and attached at their other ends to a hand lever adapted to be mounted on the handlebars of the bicycle for actuation to effect relative movement of the cable and sheath to displace the guided end of said support along said guide member from said predetermined position against the action of said spring, said control device further including a latch for retaining said hand lever in actuated position.

SANZIO P. V. PIATTI.

REFERENCES CITED

The following references are of record in the file of this patent:

UNITED STATES PATENTS

| Number | Name | Date |
|---|---|---|
| 688,838 | Dorsey | Dec. 17, 1901 |
| 1,158,311 | Schunk | Oct. 26, 1915 |
| 1,169,357 | Schickel | Jan. 25, 1916 |
| 1,649,611 | McPherson | Nov. 15, 1927 |
| 1,813,502 | Madsen | July 7, 1931 |
| 2,161,270 | Anderson | June 6, 1939 |
| 2,205,975 | Heyer | June 25, 1940 |

FOREIGN PATENTS

| Number | Country | Date |
|---|---|---|
| 81,869 | Austria | Dec. 10, 1920 |
| 180,327 | Great Britain | Oct. 26, 1922 |